US009292171B2

(12) United States Patent
Li et al.

(10) Patent No.: US 9,292,171 B2
(45) Date of Patent: *Mar. 22, 2016

(54) BORDER MENU FOR CONTEXT DEPENDENT ACTIONS WITHIN A GRAPHICAL USER INTERFACE

(75) Inventors: Jin Li, Markham (CA); Michael Wulkan, Markham (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 526 days.

This patent is subject to a terminal disclaimer.

(21) Appl. No.: 12/948,206

(22) Filed: Nov. 17, 2010

(65) Prior Publication Data

US 2012/0124515 A1 May 17, 2012

(51) Int. Cl.
*G06F 3/0482* (2013.01)
*G06F 3/0484* (2013.01)

(52) U.S. Cl.
CPC .................... *G06F 3/0482* (2013.01)

(58) Field of Classification Search
CPC ..................................................... G06F 3/0484
USPC ......................................................... 715/808
See application file for complete search history.

(56) References Cited

U.S. PATENT DOCUMENTS

| 6,549,219 | B2 | 4/2003 | Selker |
| 6,570,596 | B2* | 5/2003 | Frederiksen ................... 715/808 |
| 7,290,274 | B1* | 10/2007 | Banker et al. .................... 725/37 |
| 7,555,726 | B2 | 6/2009 | Kurtenbach et al. |
| 7,712,049 | B2 | 5/2010 | Williams et al. |
| 2004/0095395 | A1 | 5/2004 | Kurtenbach |
| 2004/0268260 | A1* | 12/2004 | Rockey et al. ................. 715/708 |
| 2005/0125736 | A1* | 6/2005 | Ferri et al. ..................... 715/747 |
| 2006/0036945 | A1* | 2/2006 | Radtke et al. ................. 715/708 |
| 2006/0161864 | A1* | 7/2006 | Windl ............................ 715/810 |
| 2007/0101296 | A1 | 5/2007 | Won et al. |
| 2007/0220440 | A1* | 9/2007 | Song et al. ..................... 715/776 |
| 2008/0222569 | A1 | 9/2008 | Champion et al. |

(Continued)

FOREIGN PATENT DOCUMENTS

WO    WO2008066736    *  6/2008

OTHER PUBLICATIONS

Negroponte et al., User Interface, WO 2008/066736 A2, Jun. 5, 2008.*

*Primary Examiner* — Jennifer To
*Assistant Examiner* — Ashley Fortino
(74) *Attorney, Agent, or Firm* — Patents on Demand P.A.; Brian K. Buchheit; Scott M. Garrett

(57) ABSTRACT

A border menu can be presented on four sides of an outer border of a graphical user interface. The border menu can be presented at the top of a stack of a graphical user interface. The border menu can include a set of user-selectable options, each selectable via a pointing device, each of the user-selectable options being associated with at least one of an icon or text button. At least one of the user-selectable options can be presented along each of the four sides of the outer border of the border menu. Selection of each of the user-selectable options can result in triggering an event, which results in firing of a programmatic action to run executable code for a corresponding one of the user-selectable options. At least a portion of the user-selectable options can include application-specific options for an application running on the computing device.

19 Claims, 3 Drawing Sheets

(56) References Cited

U.S. PATENT DOCUMENTS

2009/0309849 A1 12/2009 Iwema et al.
2010/0058242 A1 3/2010 Kimoto
2010/0192102 A1 7/2010 Chmielewski et al.

* cited by examiner

BORDER MENU FOR CONTEXT DEPENDENT ACTIONS WITHIN A GRAPHICAL USER INTERFACE

BACKGROUND

The present invention relates to the field of graphical user interface enhancements, and, more specifically, a border menu for context dependent actions within a graphical user interface.

Graphical user interfaces (GUIs) are human-to-machine interfaces that permit users to interact with programs on a computing device via graphical icons and other visual indicators. Interactions with a GUI Actions are able to be performed through direct manipulation of the graphical elements, such as through use of a mouse, trackball, touchpad, touch screen, etc. Design of the visual composition and behavior of a GUI is an important part of successfully designing software applications. GUI design has a goal to enhance user experience through maximizing the efficiency and ease of use of the GUI's underlying logical design. Two models often used to discuss GUI design and to gage its success or failures include Fitt's law and Hick's law.

Fitt's law is a model that predicts that the time required to rapidly move to a target area is a function of the distance to and the size of the target. Larger targets and smaller distances yield better results. More specifically, Fitt's law is used to model the act of pointing, either by physically touching an object with a hand or finger or by pointing to an object using a pointing device (e.g., mouse, trackball, etc.). Hence, quantified numbers for time to an object can be calculated using Fitt's law, which permits different GUI designs to be compared using a uniform metric.

Hick's law describes the time it takes a person to make a decision as a result of a possible set of choices he or she has. By Hick's law, an amount of time taken to process a certain amount of choices is known as the rate of gain of information. Hick's law has a logarithmic form that expresses depth of a choice tree hierarchy. The logarithmic form reflects that people (and GUI interfaces) often subdivide a total collection of choices into categories, which permits an elimination of about half of a set of remaining choices at each step, rather than considering each and every choice one-by-one, requiring linear time. Hick's law can be used to evaluate GUI design decisions, as intelligent subdivisions (such as use of submenus) or other form of category based subdivision of choices can alter human cognition of the choices from linear time to a logarithmic time.

The above principles have been applied in developing a set of known solutions, each having a goal of maximizing user efficiency when interacting with a GUI. These known solutions include linear context menus, a pie menu, a hybrid menu, and a quadrant menu, each having their own advantages and disadvantages.

A linear context menu can be invoked by right clicking after a selection is made of a GUI object. This brings up a menu having a set of choices relevant to the selected object. Choices often include cut, copy, paste, and other context dependent actions. Linear context menus are often presented close to the cursor location, which can be beneficial based on Fitt's law (e.g., minimizing distance to a target). An introduction of submenus can have advantages achieved in accordance with Hick's Law, since the number of items at top-level are reduced. Submenus also introduce an inefficiency in overall performance, as multiple targets are needed to ultimately select from among the available choices.

A pie menu, also referred to as a radial or marking menu, presents menu options within a radial fashion, where multiple radial menus can be cascaded (i.e., submenus can be used). Pie menus can represent an improved efficiency over traditional menus by reducing target distance factor and increasing a target size (per Fitt's law). One potential disadvantage of a pie menu is that first-level menu items are often more suitably presented as icons instead of text, which limits expressiveness. Additionally, both linear context menus and pie menus do not perform well when a number of top-level menu actions increases. For example, both menu types experience substantially degraded performance when top-level menu choices include more than seven items.

A hybrid menu represents a combination of a pie and a linear context menu within a single structure. A hybrid menu can solve limitations of the iconic nature of the pie menu. Implementations that have a linear context menu appear at a fixed location can create a difficulty when top-level pie menu selections change. Additionally, hybrid menus have problems with scalability.

A quadrant menu attempts to address scalability issues and problems with the iconic nature of some menu structures (e.g., the pie menu). A quadrant menu establishes a trigger point location, where the quadrant menu is invoked. From this trigger point, menus can be presented in an upper right quadrant, an upper left quadrant, a lower right quadrant, and a lower left quadrant. This solution often crowds a screen, obscuring other information. Additionally, it suffers from problems when invoked close to a screen edge.

SUMMARY

According to one aspect of the disclosure, a computer program product can include a border menu of a graphical user interface. The computer program product can be stored on a non-transient storage medium that is able to be executed by a processor of computing device. The border menu can be presented on four sides of an outer border of a graphical user interface. For example, the border menu and included menu items can be positioned at a screen edge, meaning the four edges of the computing device's display screen. Positioned in this manner, it is impossible to overshoot menu items by moving a mouse (i.e., the mouse cannot be moved beyond the screen edge) or similar pointing device. The border menu can be presented at the top of a stack of a graphical user interface. The border menu can include a set of user-selectable options, each selectable via a pointing device, each of the user-selectable options being associated with at least one of an icon or text button. At least one of the user-selectable options can be presented along each of the four sides of the outer border of the border menu. Selection of each of the user-selectable options can result in triggering an event, which results in firing of a programmatic action to run executable code for a corresponding one of the user-selectable options. At least a portion of the user-selectable options can include application-specific options for an application running on the computing device. The application can be an application currently having focus within a graphical user interface. The application-specific options can include a set of context-dependent options specific to a context of the current application state of the application.

According to one aspect of the disclosure, a user is presented with context dependent actions using a border menu. In this aspect, a user selection of a GUI object within a graphical user interface of an application running on a computing device can be detected. A set of object-specific actions relevant to the GUI object can be detected for a current application state of the application. Responsive to the user selection of the GUI object, a border menu can be visually presented, which was not previously shown. The border menu can include a set of user-selectable options. At least a portion of the user-selectable options include an option for each of the object-specific actions relevant to the GUI object for the current application state. The border menu can be presented at an outer border of a display of the graphic user interface along at least two of the sides of the display. A user selection of one of the user-selectable options can be received. A programmatic action corresponding to the selected one of the user-selectable options can be triggered. Responsive to the user selection of the one of the user selectable options, a display state of the border menu can be automatically adjusted so that the border menu is no longer visually presented.

DETAILED DESCRIPTION

Figure 1:
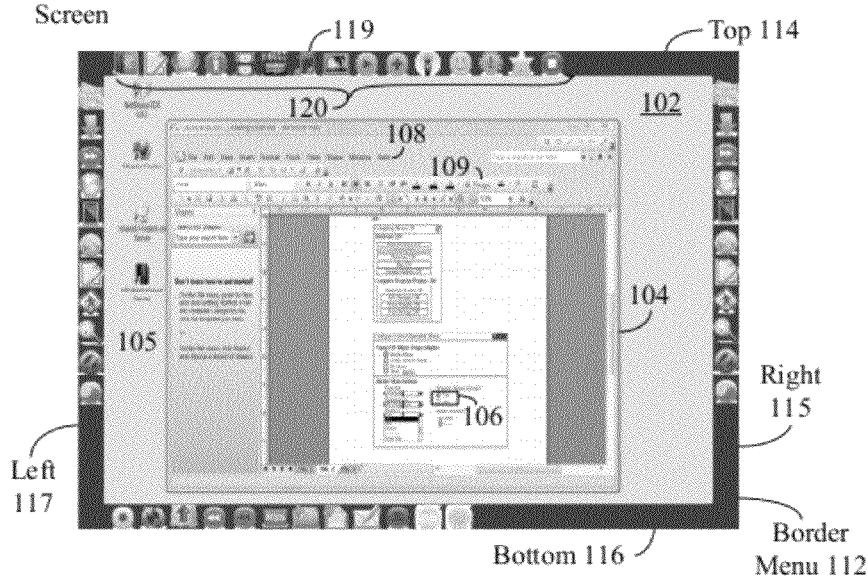
FIG. 1 shows a border menu of a graphical user interface in accordance with an embodiment of the disclosure.
Figure 1:
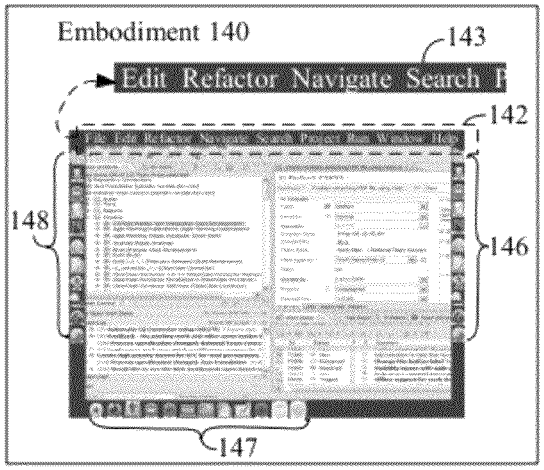
Figure 1:
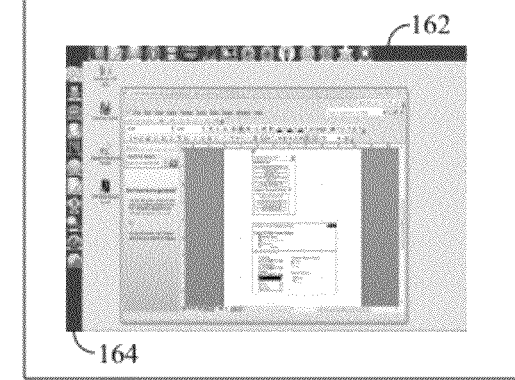
Figure 1:
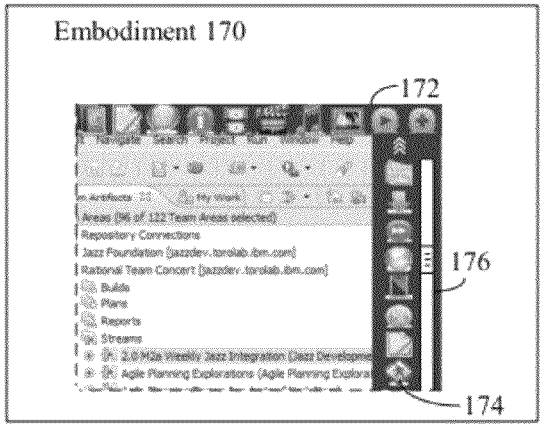
Figure 1:
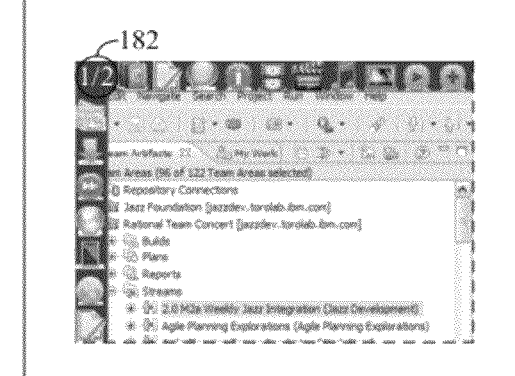

The present disclosure introduces a border menu, which is a context dependent menu that presents user selectable options along the four sides of a screen. Embodiments are contemplated where the border menu uses less than four sides (e.g., three, two, or even one) of the border of a screen. A border menu advantageously provides a substantial amount of room at a top-level, which reduces a need for deep cascading of sub-menus. At the same time, different sides of the border menu can be categorized, which provides cognitive advantages in accordance with Hick's law. Use of border menus results in a low probability of a menu obscuring a needed part of the application, which is a common problem with pop-up linear context menus. Each command presented in the border menu can be relatively large (increased size of target) since it is positioned at a border, which is proven to be an advantage in menu design as per Fitt's law, which counterbalances an increased distance to the target compared to linear context menus.

In one embodiment, the border menu can integrate context menu functions and static menu functions within the same menu artifact. That is, it can replace a main application menu (e.g., menu bar at the top of an application) and a linear context menu by providing all actions applicable at any time to users via the border menu. In another embodiment, the border menu can be a context dependent menu, which is selectively presented and hidden on a graphical user interface, depending on whether context dependent menu options are applicable.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a border menu 112 of a graphical user interface in accordance with an embodiment of the disclosure. The border menu 112 includes a number of user selectable items 119, each of which is a discrete graphical element able to be selected through use of a mouse, trackball, touchpad, touch screen, etc. Selection of any of the items 119 results in a programmatic action linked to that item 119 executing in response to the selection.

The border menu 112 is presented along an edge of the screen 100. Since each element 119 of the border menu 112 is positioned at the screen 100 edge, movement of an on-screen (100) pointer cannot overshoot the item 119. Stated differently, the screen 100 border is infinitely deep, so that no matter how fast a mouse (or other pointer manipulation device) is moving, the mouse cannot cause the pointer to overshoot a border menu 112 item. Thus, the positioning of the items 119 on the screen 100 border permits faster user access. In terms of Fitt's Law, the size of each item 119 due to positioning from an item selection perspective is greater than the physical size of that item's 119 presentation on the screen 100 due to the infinitely deep border, which cannot be overshot.

The screen 100 itself is a rendered screen, such as one displayed on a computer monitor or other electronic visual display. In one embodiment, the screen 100 can be defined as a graphical user interface region within which a user is able to interact using a pointing device. Thus, if a computer desktop extends to multiple monitors, the screen 100 extends across these monitors as well.

The screen 100 can include a graphical user interface desktop 102, zero or more application windows 104, user selectable icons 105, and other GUI elements. In one embodiment, the application window 104 can include an application specific menu 108, toolbar 109, and the like, which are functionally redundant with items 119 of the border menu. In another embodiment, the border menu 119 can replace one or more application specific menus 109, toolbars 109, linear context menus, etc. The border menu 112 can be positioned outside the boundaries of an application window 104, even though the items 119 of the border menu 112 can be application specific.

In one embodiment of the invention, one or more of the items 119 of the border menu 112 are context dependent items. For example, when object 106 is selected from within GUI 104, a set of options specific to object 106 can be determined, where the context dependent ones of the items 119 correspond to one of the options specific to object 106. When all of the items 119 are context specific, the border menu 112 can be dynamically shown and hidden, where it is only shown when the options specific to the object 106 are relevant. For example, in situations where a popup linear context menu would be shown for object 106 (such as responsive to a right mouse click), the border menu 112 can be shown instead, and when an analogous linear context menu would not be shown, the border menu 112 will be hidden.

In one embodiment, the border menu 112 can be shown whenever a corresponding application window 104 has focus, where all of the items 119 can correspond to a set of actions a user is able to take for the application, given a current application state. Thus, in one embodiment, the items 119 can correspond to general application options as well as context dependent ones. In the described embodiment, when another application (not shown, but one other than window 104) has focus, the items 119 of the border menu can responsively change so that the presented items 119 are specific to whatever application currently has focus within the desktop 102.

In one contemplated embodiment, a variety of aesthetic and/or functional behavioral characteristics can be associated with the border menu 112, which can be configured to suit a user's preferences. These characteristics can include, for example, border width, icon size, background color, foreground color, font, whether the border menu 112 has an always-on-top of stack proper set for it, a hidden attribute, a configurable visibility time-out period, etc. When a hidden option is enabled for the border menu 112, the menu 112 may be hidden unless a pointer is positioned proximate to the border (or edge) of the screen 100, at which point the border menu 112 is automatically shown.

In one embodiment, the border menu 112, when visible, can adjust the overall size of the screen 100 available to applications. That is, presence of the border 112 causes the remaining portion of the desktop 102 to shrink to fit (or be clipped) into the remaining region. Thus, the effective screen 100 region when the border menu 112 is shown would be reduced to:

Effective Screen Height=Screen Height−(2*Height of Border Menu)

Effective Screen Width=Screen Width−(2*Width of Border Menu)

In a different embodiment, the screen 100 height and width can be unmodified by the presence or absence of the border menu 112, which is positioned on top of the window stack so that it is shown. Additionally, in one embodiment, when a desktop application window (e.g., window 104) is maximized on the desktop 102 when the border menu 112 is visible, the maximized window is reduced to the Effective Screen Height and Effective Screen Width to prevent the border menu 112 from obscuring portions of the maximized application window 104. Specifics implemented for any particular implementation of the border menu (such as those outlined above) can vary depending on design choices of a programmer and/or depending on user preferences, as recorded within user configurable settings.

In one embodiment, a logical grouping of items 119 can be performed, where each related group is shown on the same edge of the border menu 112. For example, the top 114 of the border menu can include items 119 for one category, bottom 116 can include items 119 for a different category, right 115 can include items 119 for a third category, and left 117 can include items 119 for a fourth category. Each of the categories (corresponding to a side 114-117 of the border menu 112) can represent an exploitation of Hick's law. More specifically, once a user is experienced in which category his or her target item 119 is grouped within, the time to make a decision as a result of a possible set of choices he or she has is reduced.

The border menu can accommodate iconic, textual, or a combination of the two for the items 119. For example, embodiment 140 shows a combination where the top 142 items are textual, and side 146, 147, 148 items are iconic.

Although a default of the border menu 112 may have a menu with four sides (e.g., top 114, bottom 116, left 117, and right 115), other arrangements are contemplated. Embodiment 160 shows, for example, a border menu 112 having only a top 162 and left 164 side. In one embodiment, a number of sides shown for a border menu 112 can vary based on a quantity of user available options given a current application state.

For example, in one embodiment, two sides of the border menu 112 can include selectable options for an application, where these options are static options available for the application at any time. A remaining two sides of the border menu 112 can present options for dynamic and context based conditions, such as those available for object 106, when it is selected. The two sides of the border menu 112 with static options for the application can remain presented whenever the application has focus, where the two sides for dynamic conditions can be selectively hidden/visible depending on whether any context dependent options are available given a current application state.

In many configurations, the border menu 112 provides ample room for presenting commands, so that submenus are unnecessary. For example, if we are using 32×32 icons for items in a border menu and the desktop 102 resolution is set of 1024×768 (a relatively low-end screen resolution for a desktop computer), then there are 108 slots for border menu options. Hence, in typical configurations, there would be no need to cascade sub-menus as all relevant commands can be shown at top-level. Of course, different configurations for screen size, icon size, etc. can be preferred for different devices and implementations. For example, a touch screen of a smart phone or media play (with a GUI) can be relatively limited in terms of available screen space for menu presentation. Additionally, buttons, icons, or other items 119 of the border menu 112 may be bigger by default for touch screen input where a user uses their finger for selecting options than when selection occurs by moving a pointer via a mouse or other such device.

The border menu is a scalable solution, where additional options can be presented as needed, which are not able to be presented at top level in a flat manner with all other available options. Numerous reasons can exist for this need (e.g., too many items to present in the available slots of a border menu 112; user preference; minimizing options that need to be digested at any one time by a user; etc.), which are not especially relevant for purposes of whether this need can be accommodated, which it can. For example, embodiment 170 incorporates a scroll bar 176 on a right side 174 of a border menu. Selection of the scroll bar 176 can present additional selectable options. Other sides of the border menu, such as side 172, may or may not have a scroll bar 176.

Embodiment 180 shows a switch control 182, which can cycle between sets of commands, when clicked or otherwise activated. Embodiment 180 shows a first of two sets of commands. Clicking on control 182 can result in the number shown in control 182 changing to reflect the second of two sets of commands. Variants of embodiment 180 can exist, where the switch control 182 changes all items of the current border menu, where selection of control 182 changes only some of the commands (a bottom and left side for example, while leaving the top and right side options unchanged), and the like. Further, switch controls like control 182 can be implemented for specific sides of a border menu only, in one contemplated embodiment.

Additionally, the quantities of options available for the border menu 112 can result in a static display of items 119 in known positions, by default. This can be advantageous in presenting options in a predictable, uniform location, which can improve usage efficiency. Contemplated embodiments of the border menu 112 can, however, implement dynamic (or intelligent) options. That is, the options presented in one or more sides of the menu bar can be dynamically selected, ordered, or positioned based on anticipated relevancy. For example, only the top (or most relevant) ten options can be presented on a right hand side 115 of the border menu, even though additional options are available. Application state and user usage can change which of the options are believed to be most relevant. Further, ordering (even when no filtering occurs) based on relevancy scores can be performed for a border menu 112, in one contemplated embodiment of the disclosure.

Figure 2:
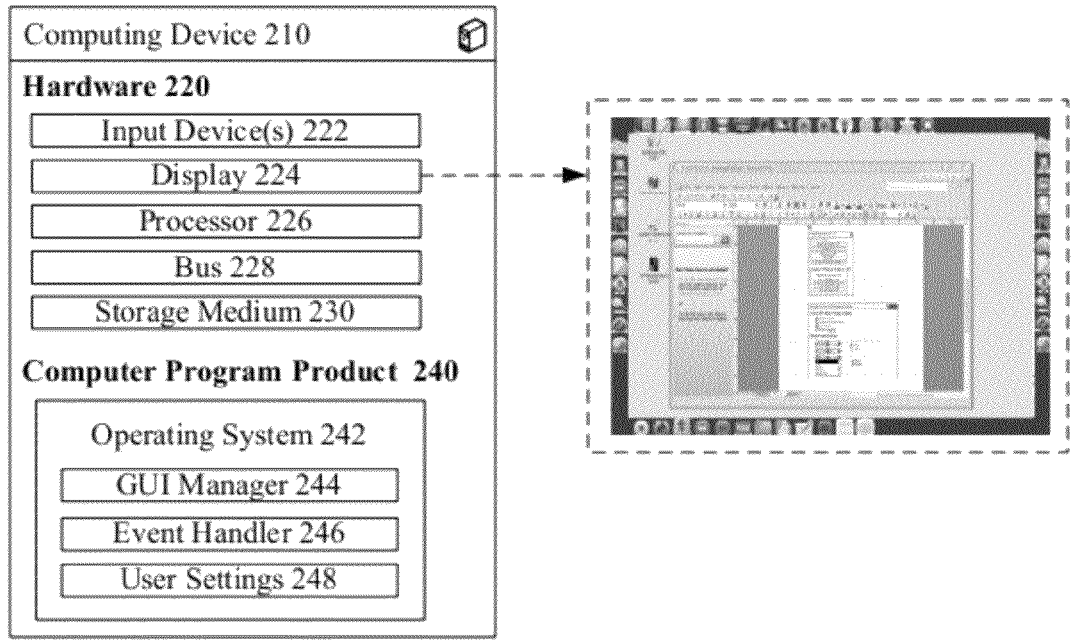
FIG. 2 shows a system having a border menu capability in accordance with an embodiment of the disclosure.
Figure 2:
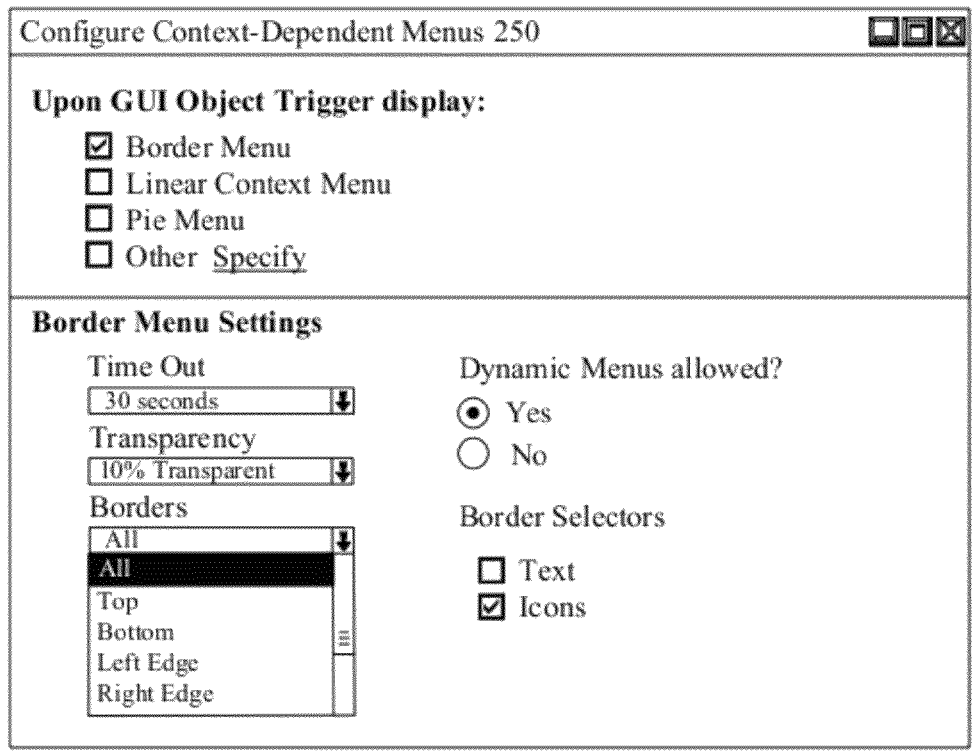

FIG. 2 shows a system 200 having a border menu 212 capability in accordance with an embodiment of the disclosure. The border menu 212 can be an implementation of the previously described border menu 112.

System 200 shows a computing device 210 that includes hardware 220 and one or more computer program products 240. The computing device 210 can be any apparatus or device having a graphical user interface (GUI), which includes a multimodal interface with a visual modality. The computing device 210 can be, but is not limited to, a personal computer, a smart phone, a media player, a consumer electronic device, a kiosk, a gaming system, a navigation system, and the like. Device 210 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

The hardware 220 can include one or more processors 226 able to execute programmatic instructions of one or more computer program products 240. The processor 226 can be connected to other hardware 220 components, which include storage medium 230, via a bus 228. Storage medium 230 can be a non-transitory storage medium, such as a hard drive, Random Access Memory (RAM), a solid state drive, an optical storage medium (DVD disk, BLU-RAY disk), and the like. Hardware 220 can include ports for interacting with external input 222 and output (e.g., display 224) components or can include one or more embedded or integrated input/output components (devices 222 and/or display 224).

Input device(s) 222 can be used to specify a position in space within a graphical user interface. Input devices 220 can provide direct or indirect input. With direct input, an input space can coincide with the display space, such as common with touch screens, light pens, and the like. Indirect input can be absolute (e.g., a graphic tablet) or relative (e.g., mouse, trackball, in air accelerometers, etc.) where a controlling device can be lifted and repositioned.

Display 224 can be an output device capable of visually presenting a graphical user interface. The display 224 can be active or passive and can use a digital or analog input signal depending on implementation specifics. Common display 224 types include Liquid Crystal Displays (LCDs), Cathode Ray Tube displays (CRTs), Organic Light Emitting Diode (OLED) displays, video projector displays, e-ink displays (e.g., field emission display), electronic paper displays, and the like.

The computer program products 240 can include an operating system 242, one or more applications 249 executing on top of the operating system, firmware, and the like. In one embodiment, a GUI manager 244 can be used to manage graphical user interface objects and interactions. Additionally, an event handler 246 can be used to associate input with specific events, such as a mouse-click, a movement event, and the like. Events are "fired", which applications 249 can respond to. In one embodiment, the border menu 212 can be implemented by the GUI manager 244 and can generate "standard" events through the event handler 246, so that each application 249 need not be modified to respond to events of the border menu 212. Thus, the border menu 212 can be implemented as a graphical structure independent of any specific application 249.

In another embodiment, the border menu 212 and applications 249 can cooperatively interact at low-levels, so that changes are dynamically made to the border menu 212 responsive to changes in application (249) state. Further, default application functionality and/or presentation structures (such as a linear context menu, or menu bar) can be replaced and superceded by the border menu 212 in one contemplated embodiment of the disclosure.

In one embodiment, a set of user specific settings 248 can be established that permits customization of border menu 212 characteristics, behavior, and integration within a GUI and/or application 249. Configuration screen 250 shows one, non-limiting, example of a screen through which a user can modify user settings 248 specific to the border menu 212.

As shown in screen 250, one configurable option 252 can permit a user to specify a type of menu-ing that is to be used, such as a border menu, a linear context menu, a pie menu, and the like. A few contemplated settings, which are intended to be illustrative and not exhaustive, for a border menu 212 are shown in settings section 260. One setting 262 permits a time-out duration for hiding the border menu 212 to be specified. A level of transparency for the border menu 212 can be selected in setting 264. The sides established for the border menu 212 can be established by setting 266. Dynamic menu items can be allowed or disallowed by setting 268. Setting 270 permits a user to select whether border items are shown as text or icons.

Figure 3:
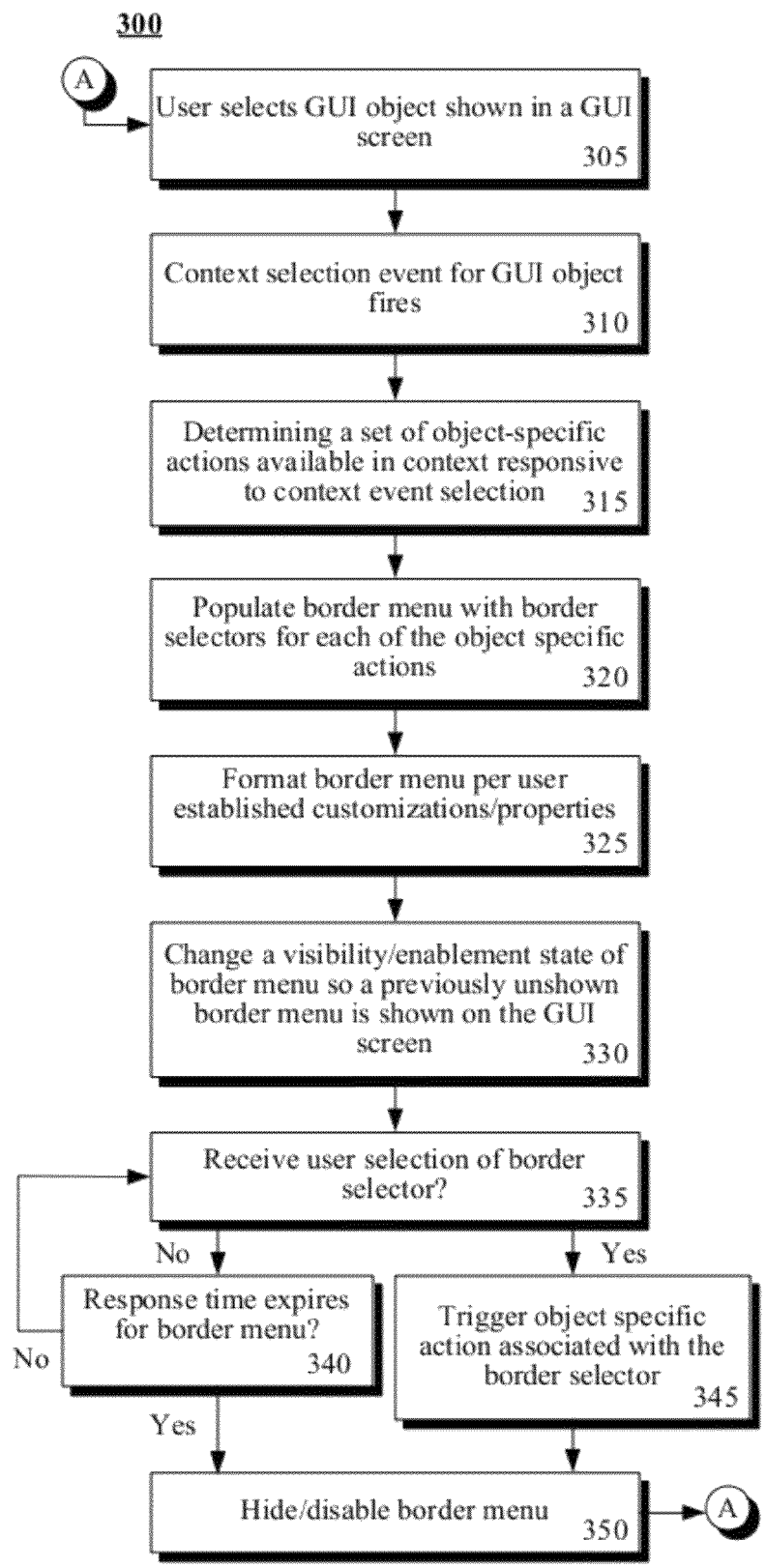
FIG. 3 shows a flow chart of a method for implementing border menus in accordance with an embodiment of the disclosure.

FIG. 3 shows a flow chart of a method 300 for implementing border menus in accordance with an embodiment of the disclosure. Method 300 assumes the border menu is a context dependent menu, which is one contemplated implementation, but is not limiting. Method 300 can be performed in context of system 200 and/or can utilize a screen, such as screen 100.

The method 300 can begin in step 305, where a user selects a GUI object shown on a GUI screen. Selection of the GUI object can cause a context selection event to fire, as shown by step 310. In step 315, a set of object-specific actions can be determined. Once these actions are determined, border menu items, one per action, can be added to the border menu, as shown by step 320. The border menu many or may not include additional items (e.g., ones other than those added in step 320).

In step 325, the border menu can be formatted per user established customizations or properties. Additionally or alternatively, application specific properties (for the application within which the GUI object as selected) can be applied to the border menu. In step 330, a visibility or enablement state of the border menu can be changed as necessary. For example, when the border menu is not shown before step 305 occurs, a previously un-shown border menu can be shown on the GUI screen.

In step 335, a user may receive a selection of a border item (or selector), such as a text item or icon. If no selection is received, step 340 can execute, where a check to see if a border-menu time-out period has expired. If so, the border menu can be automatically hidden as shown by step 350. Otherwise, the border menu can remain visible, as shown by looping from step 340 to step 335.

When a user has selected an item in step 335, step 345 can execute, where an action associated with or linked to the border menu item can be triggered. Once triggered, a related programmatic action can execute. The border menu can be automatically hidden upon a selection of a border menu item in one embodiment (where the border menu is context dependent and automatically hides or is shown depending on context), which is shown by progressing from step 345 to step 350.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product stored on a non-transient storage medium able to be executed by a processor of computing device, said computer program product comprising:
 a border menu of a graphical user interface, which is presented on four sides of an outer border of a graphical user interface,
 wherein the border menu is presented at the top of a stack of a graphical user interface, said border menu comprising a plurality of user-selectable options, each selectable via a pointing device, each of the user-selectable options being associated with at least one of an icon or text button,
 wherein at least one of the user-selectable options is presented along each of the four sides of the outer border of the border menu, wherein selection of each of the user-selectable options results in triggering an event, which results in firing of a programmatic action to run executable code for a corresponding one of the user-selectable options,
 wherein at least a portion of the user-selectable options comprise application-specific options for an application running on the computing device, wherein said application is an application currently having focus within a graphical user interface,
 wherein the plurality of user-selectable options are automatically displayed on the border menu of the graphical user interface for the application currently having focus, wherein said application-specific options comprise a plurality of context-dependent options specific to a context of the current application state of the application,
 wherein the border menu dynamically changes responsive to changes in the current application state of the application, and
 wherein the border menu dynamically changes its visibility state so that the border menu is only shown within the graphical user interface when context-dependent options specific to a context of the current application state are to be shown, and wherein the border menu is not shown within the graphical user interface when no context-dependent options specific to a context of the current application state are to be shown.

2. The computer program product of claim 1, wherein the border menu replaces functionality of a linear context menu of the application.

3. The computer program product of claim 1, wherein the user-selectable options are a first set of options, where at least a second set of different user-selectable options exist, wherein said border menu comprises a switch control, wherein selection of the switch control changes the shown options from showing the first set of options to showing the second set of options.

4. The computer program product of claim 1, wherein each of the user selectable options are presented on the outer edge of the display so that it is impossible for a user to overshoot the user-selectable options by moving a pointing device beyond the user-selectable options relative to the outer edge.

5. The computer program product of claim 1, wherein the user selectable options of the border menu comprise all application options selectable given the current application state.

6. The computer program product of claim 1, wherein a plurality of different applications are running on the computing device, wherein said user-selectable options of the border menu dynamically change as different ones of the different applications receive focus so that the border menu continuously and dynamically presents all options available for the application having focus.

7. The computer program product of claim 1, wherein the border menu is positioned outside the boundaries of an application window of the application.

8. A computer program product for presenting a user with context dependent actions within a user interface, the computer program product comprising a non-transitory computer readable storage medium having computer usable program code embodied therewith, the computer usable program code comprising:
 computer usable program code stored on a non-transitory storage medium that when executed by a processor is operable to detect a user selection of a GUI object within a graphical user interface of an application running on a computing device;
 computer usable program code stored on a non-transitory storage medium that when executed by a processor is operable to determine a plurality of object-specific actions relevant to the GUI object for a current application state of the application;
 computer usable program code stored on a non-transitory storage medium that when executed by a processor is operable to, responsive to the user selection of the GUI object, visually present a border menu, which was not previously shown, said border menu comprising a plurality of user selectable options, wherein at least a portion of the user-selectable options comprise an option for each of the object-specific actions relevant to the GUI object for the current application state, wherein said border menu is presented at a outer border of a display of the graphic user interface along at least two of the sides of the display, wherein the border menu dynamically changes responsive to changes in the current application state of the application, wherein the border menu automatically displays the application-specific options for the application currently having focus, wherein the border menu dynamically changes its visibility state so that the border menu is only shown within the graphical user interface when context-dependent options specific to a context of the current application state are to be shown, and wherein the border menu is not shown within the graphical user interface when no context-dependent options specific to a context of the current application state are to be shown;
 computer usable program code stored on a non-transitory storage medium that when executed by a processor is operable to receive a user selection of one of the user-selectable options;
 computer usable program code stored on a non-transitory storage medium that when executed by a processor is operable to trigger a programmatic action corresponding to the selected one of the user-selectable options; and
 computer usable program code stored on a non-transitory storage medium that when executed by a processor is operable to, responsive to the user selection of the one of the user selectable options, automatically adjust a display state of the border menu so that it is no longer visually presented.

9. The computer program product of claim 8, wherein the at least two sides comprises four sides, wherein the border menu is presented at the top of a stack of the graphical user interface, wherein each of the user selectable options are selectable via a pointing device, each of the user-selectable options being associated with at least one of an icon or text button, wherein at least one of the user-selectable options is presented along each of the four sides of the outer border of the border menu, wherein said application is an application currently having focus within a graphical user interface.

10. The computer program product of claim 8, wherein the border menu is a graphical user interface control managed by a graphical user interface manager, wherein an operating system level event handler handles user selection events for each of the user selectable options, where the event handler maps the user selection events to programmatic actions including the programmatic action of the triggering.

11. The computer program product of claim 8, wherein the border menu is configured to adjust an overall space of the graphical user interface available to the application based on a shrink to fit technique.

12. The computer program product of claim 8, wherein the border menu comprises a logical grouping of the plurality of user-selectable options, wherein the logical grouping is based at least on functionalities of the plurality of user-selectable options.

13. The computer program product of claim 8, wherein the border menu is implemented as a graphical structure independent of the application.

14. A system for presenting a user with context dependent actions within a user interface, the system comprising:
 a graphical user interface (GUI) manager configured to:
  detect a user selection of a GUI object within a graphical user interface of an application running on a computing device;
  determine a plurality of object-specific actions relevant to the GUI object for a current application state of the application;
  responsive to the user selection of the GUI object, visually present a border menu, which was not previously shown, said border menu comprising a plurality of user selectable options, wherein at least a portion of the user-selectable options comprise an option for each of the object-specific actions relevant to the GUI object for the current application state, wherein said border menu is presented at a outer border of a display of the graphic user interface along at least two of the sides of the display, wherein the border menu dynamically changes based on usage of the user-selectable options by a user, wherein the border menu automatically displays the application-specific options for the application currently having focus, wherein the border menu dynamically changes its visibility state so that the border menu is only shown within the graphical user interface when context-dependent options specific to a context of the current application state are to be shown, and wherein the border menu is not shown within the graphical user interface when no context-dependent options specific to a context of the current application state are to be shown; and
 an event handler configured to:
  receive a user selection of one of the user-selectable options;
  trigger a programmatic action corresponding to the selected one of the user selectable options; and
  responsive to the user selection of the one of the user selectable options, automatically adjust a display state of the border menu so that it is no longer visually presented.

15. The system of claim 14, wherein the border menu is a graphical user interface control managed by the graphical user interface (GUI) manager, wherein the event handler handles user selection events for each of the user selectable options, where the event handler maps the user selection events to programmatic actions including the programmatic action of the triggering.

16. The system of claim 14, wherein the border menu is configured to adjust an overall space of the graphical user interface available to the application based on a shrink to fit technique.

17. The system of claim 14, wherein the border menu comprises a logical grouping of the plurality of user-selectable options, wherein the logical grouping is based at least on functionalities of the plurality of user-selectable options.

18. The system of claim 14, wherein the border menu is implemented as a graphical structure independent of the application.

19. The system of claim 14, wherein two sides of the border menu visually present a set of static user-selectable options for the application and remaining two sides of the border menu visually present a set of context-based user-selectable options for the application.

* * * * *